Figure 10:
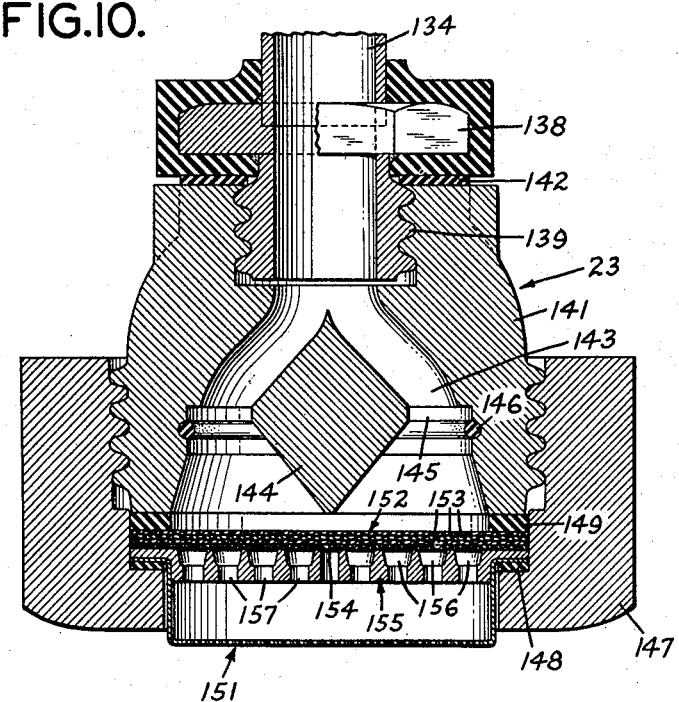

June 30, 1959  W. H. BRADSHAW  2,892,675
METHOD AND APPARATUS FOR PRODUCTION OF VISCOSE RAYON
FILAMENTARY MATERIALS
Original Filed May 16, 1951  8 Sheets-Sheet 1
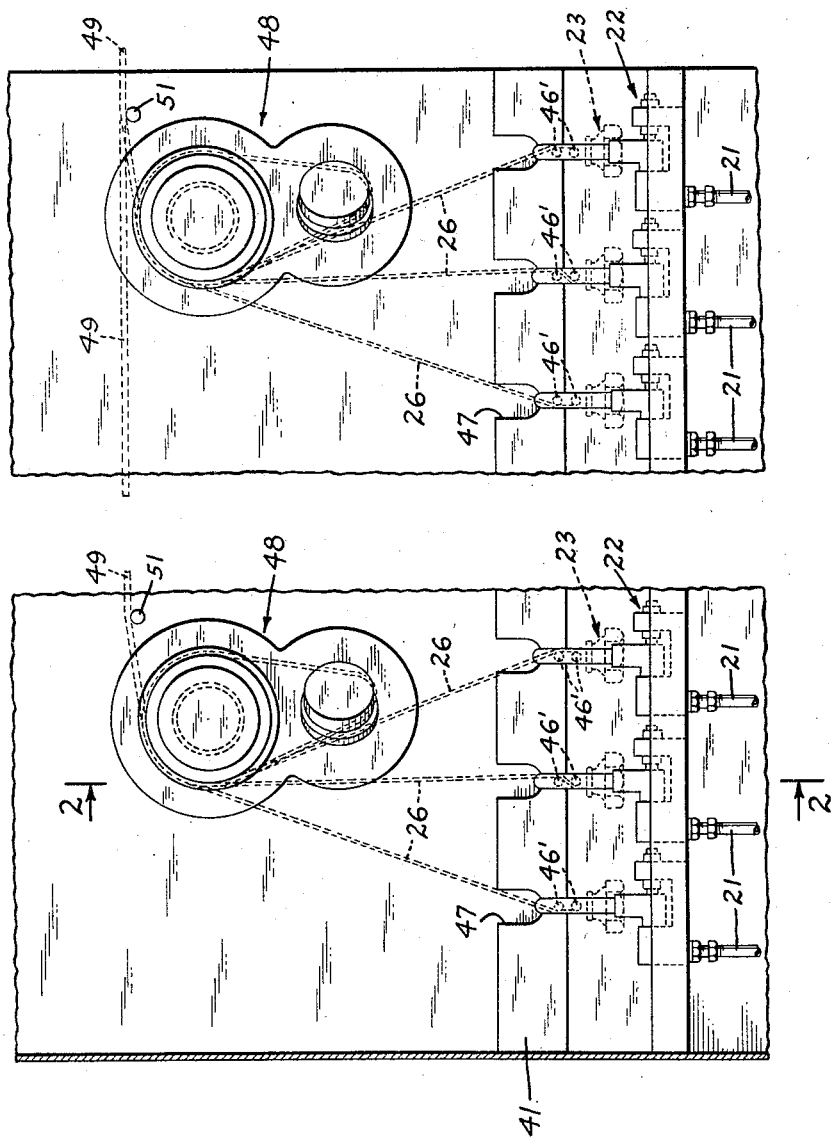
FIG.I.
INVENTOR.
WILLIAM H. BRADSHAW
BY
ATTORNEYS.

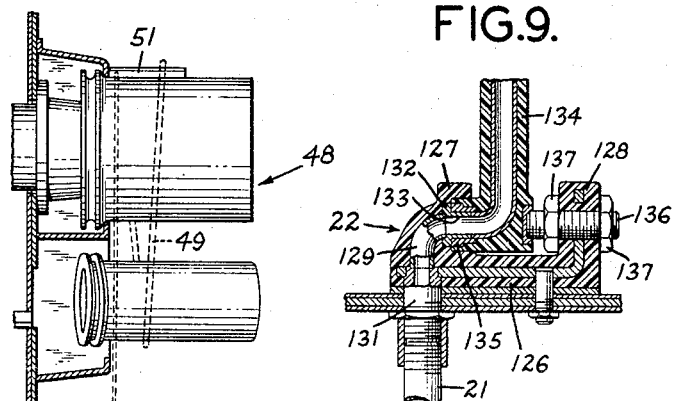
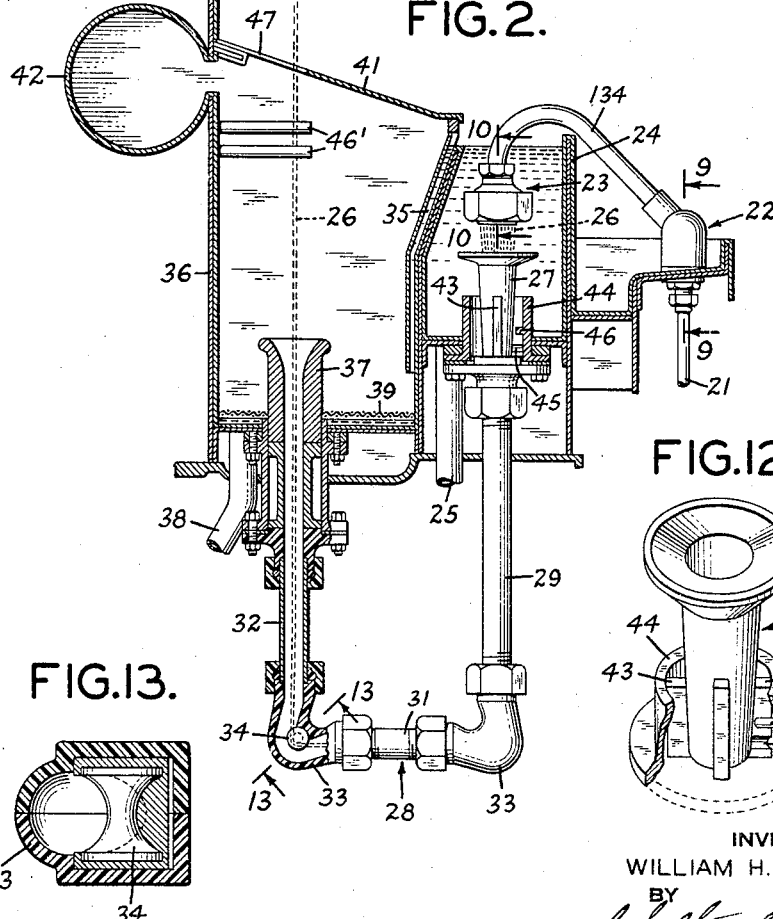
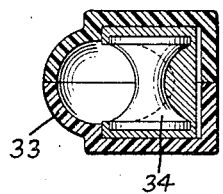
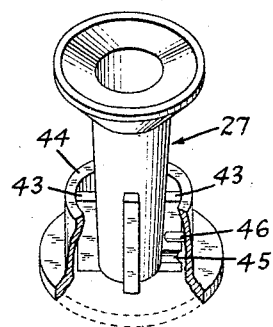
INVENTOR.
WILLIAM H. BRADSHAW

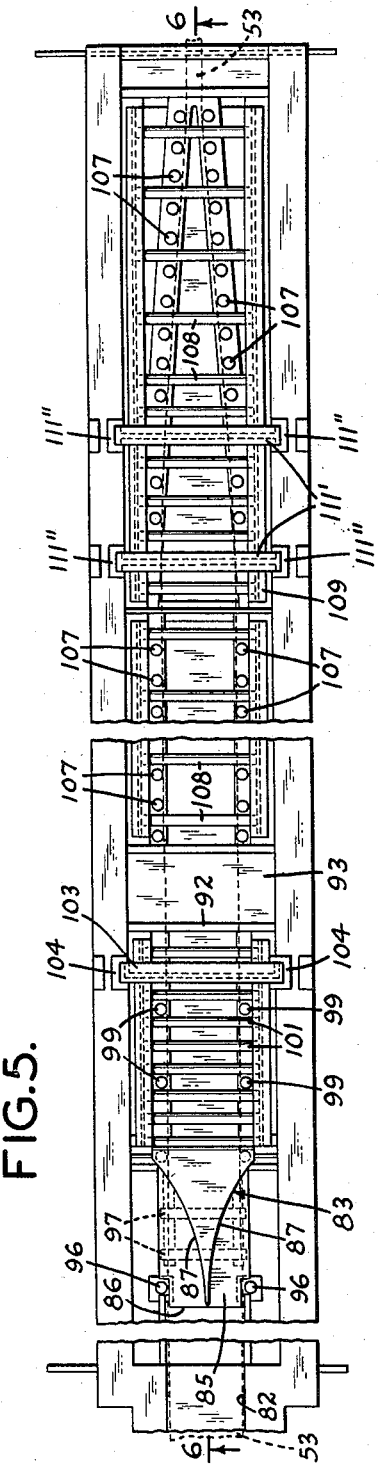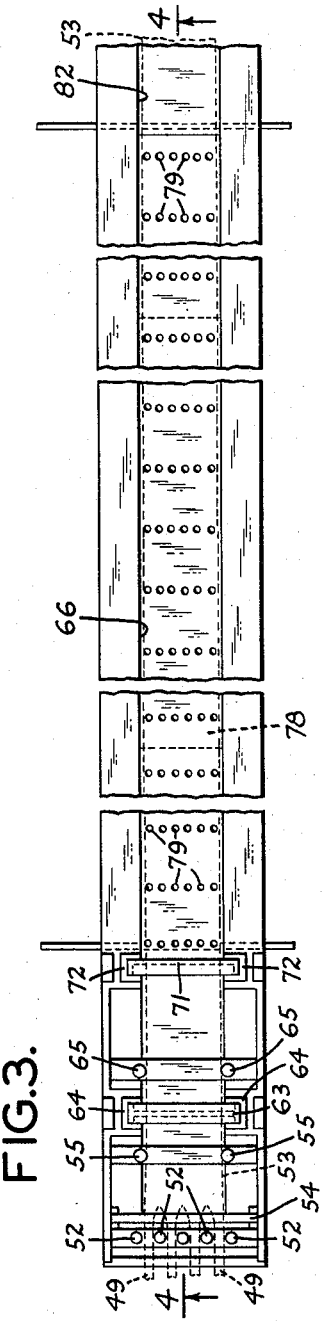

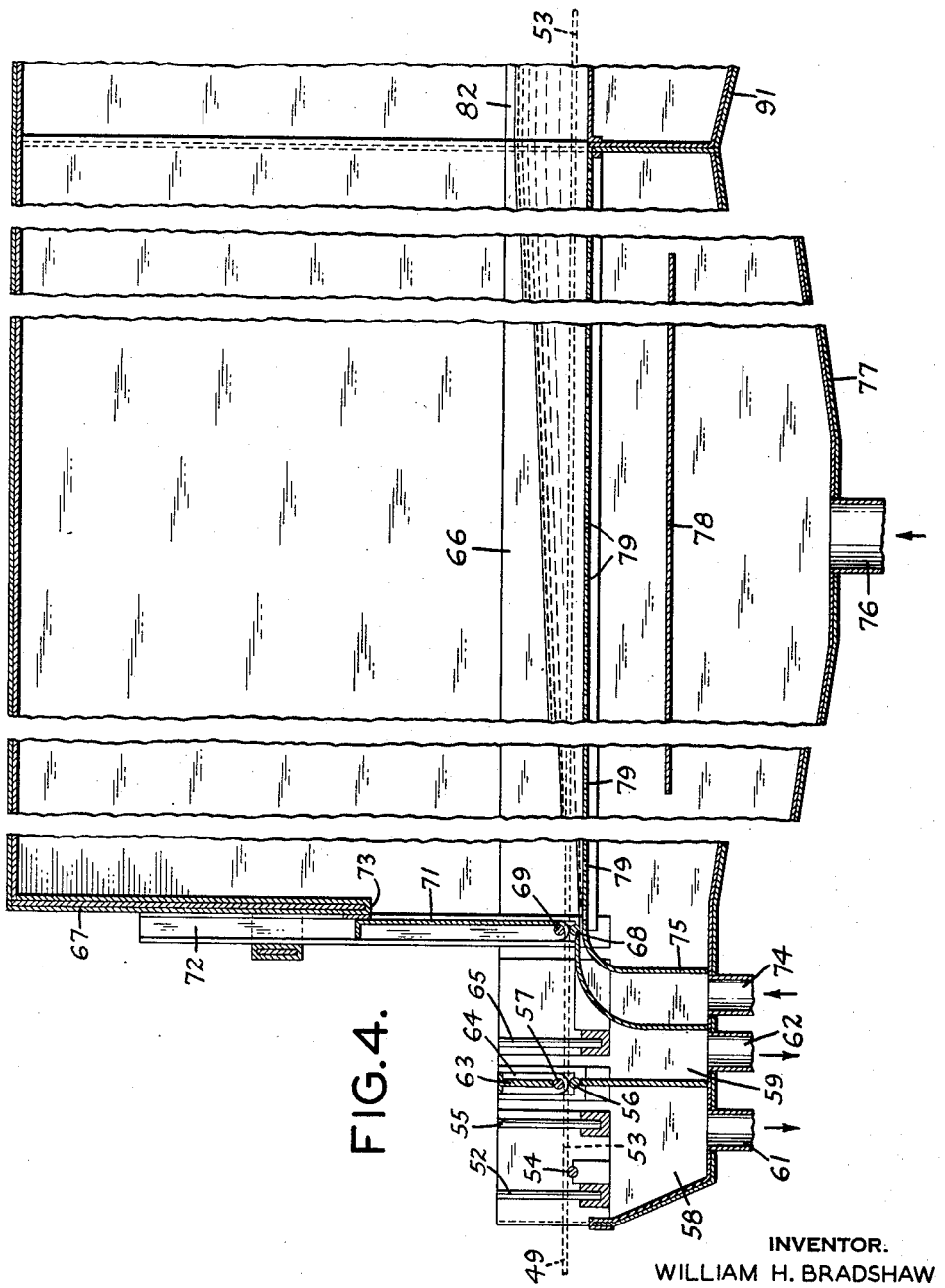

June 30, 1959 W. H. BRADSHAW 2,892,675
METHOD AND APPARATUS FOR PRODUCTION OF VISCOSE RAYON
FILAMENTARY MATERIALS
Original Filed May 16, 1951 8 Sheets-Sheet 5
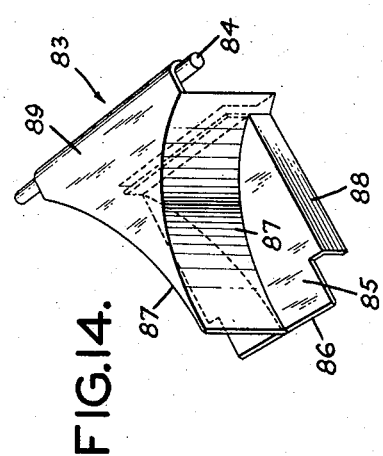
FIG.14.
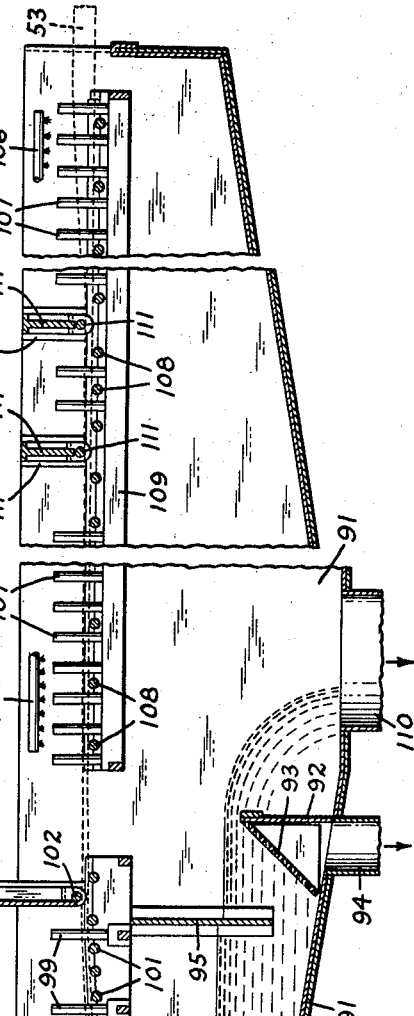
FIG.6.
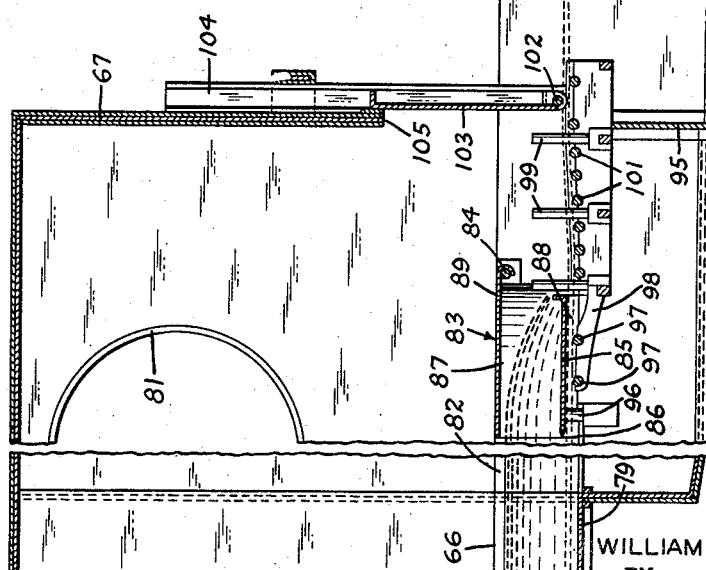
INVENTOR.
WILLIAM H. BRADSHAW
BY
ATTORNEYS.

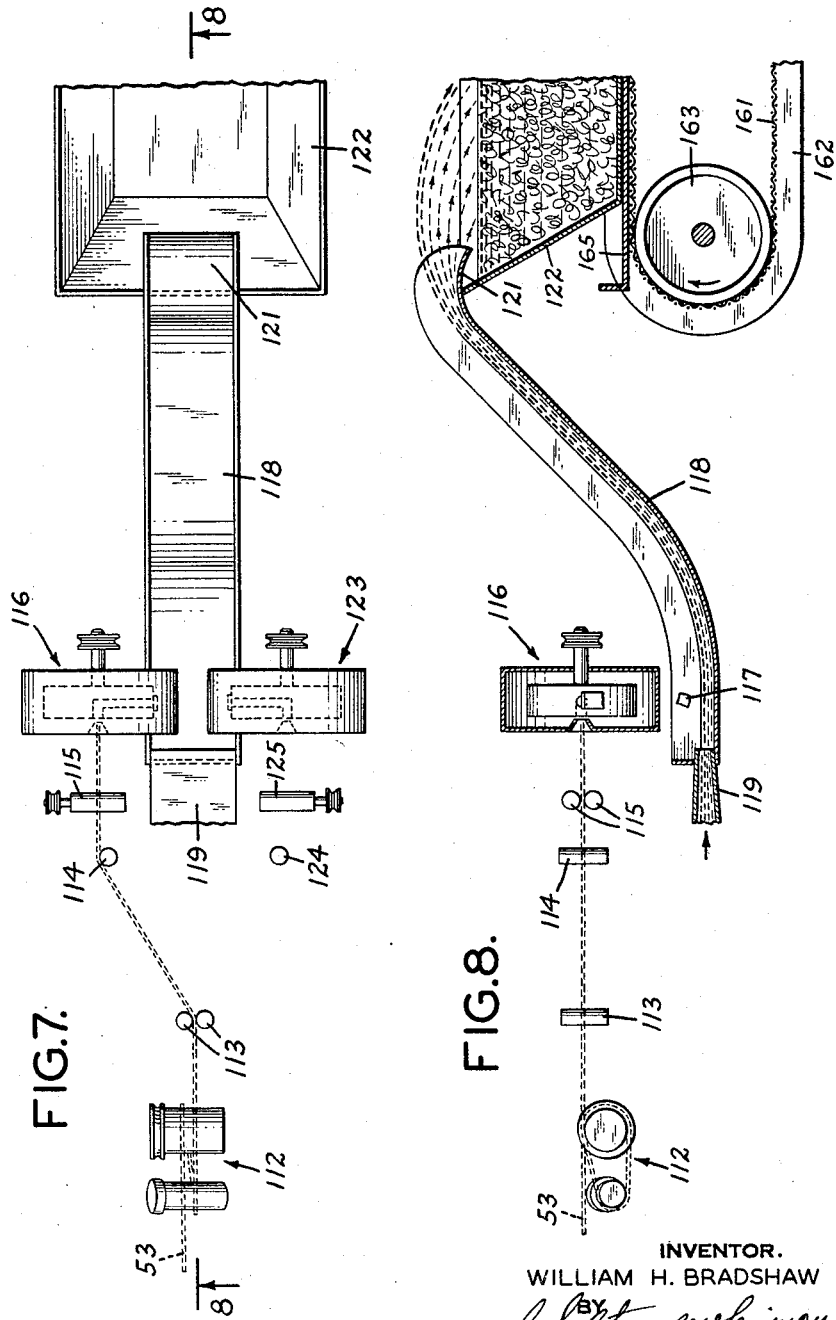

June 30, 1959 W. H. BRADSHAW 2,892,675
METHOD AND APPARATUS FOR PRODUCTION OF VISCOSE RAYON
FILAMENTARY MATERIALS
Original Filed May 16, 1951

INVENTOR.
WILLIAM H. BRADSHAW

June 30, 1959 W. H. BRADSHAW 2,892,675
METHOD AND APPARATUS FOR PRODUCTION OF VISCOSE RAYON
FILAMENTARY MATERIALS
Original Filed May 16, 1951 8 Sheets-Sheet 8

INVENTOR.
WILLIAM H. BRADSHAW
ATTORNEYS.

United States Patent Office 2,892,675
Patented June 30, 1959

2,892,675

METHOD AND APPARATUS FOR PRODUCTION OF VISCOSE RAYON FILAMENTARY MATERIALS

William H. Bradshaw, New Rochelle, N.Y., assignor to Celanese Corporation of America, New York, N.Y., a corporation of Delaware Original application May 16, 1951, Serial No. 226,593, now Patent No. 2,731,667, dated January 24, 1956. Divided and this application December 24, 1953, Serial No. 400,201

11 Claims. (Cl. 8—151)

This invention relates to the production of viscose rayon filamentary materials and relates more particularly to a novel process and apparatus for the production of viscose rayon filamentary materials in a continuous manner.

An important object of this invention is to provide a novel process and apparatus for the production of viscose rayon filamentary materials in a continuous manner which will be especially efficient in operation and simple in construction.

Another object of this invention is to provide a novel process and apparatus for the production of viscose rayon fibers of staple length having desirable physical properties.

Other objects of this invention, together with certain details of construction and combination of parts, will be apparent from the following detailed description and claims.

This appliction is a division of application Ser. No. 226,593, filed May 16, 1951, now Patent No. 2,731,667.

In the production of viscose rayon filamentary materials, particularly viscose rayon fibers of staple length, it is necessary to subject said filamentary materials to a series of successive treatments under closely controlled conditions to obtain products having desirable physical properties. Advantageously, to minimize the expense involved in producing the viscose rayon filamentary materials, the successive treatments should be carried out automatically and with a minimum of manual labor.

According to the present invention, there is provided a novel process and apparatus for the production of viscose rayon filamentary materials which will fulfill the foregoing requirements, the apparatus being divided into four sections: a spinning section, a stretching section, a cooling section, and a cutting and opening section, through which sections the viscose rayon filamentary materials pass in succession. In the spinning section, a viscose composition is pumped through a spinning jet, in the form of a strand containing up to 5000, or more, filaments into a coagulating medium which initiates the setting of the filaments. The strand and the coagulating medium are then caused to flow in the same direction through a generally U-shaped spinning tube wherein the setting of the filaments continues. As the strand emerges from the spinning tube, it is combined with the strands from one or more jets into a tow and is passed around a godet wheel which determines the speed of the tow and also provides a resistance against which the tow can be stretched by a drum over which it passes later on.

One or more tows then pass into a stretching section wherein they are combined into a tow having the form of a flat sheet and are treated with a liquid having a plasticizing action on the fibers to condition said fibers for the stretching operation. To insure that all of the fibers are uniformly plasticized, at least a portion of the plasticizing liquid is applied to the tow at a high velocity through a nozzle which is positioned to direct the plasticizing liquid to travel in the same direction as the travel of the tow. The high velocity with which the plasticizing liquid emerges from the nozzle causes the said liquid to impregnate and permeate the tow thoroughly thereby insuring a uniform plasticization of all the filaments in the tow. In the stretching section, the tow is not only plasticized, but has removed therefrom a major portion of the sulfur, carbon disulfide and acid sulfate contained therein. The stretching section is advantageously enclosed with a hood having an exhaust conduit connected thereto to draw off the carbon disulfide and other gases that are liberated from the tow during its passage through said section. As it approaches the end of the stretching section, the major portion of the plasticizing liquid is removed from the tow by means of a plow comprising a plate under which the tow passes and which acts to scoop the said liquid off the tow.

From the stretching section, the tow enters a cooling section wherein it is washed with cold water to cool the same and to remove therefrom the plasticizing liquid and any impurities adhering thereto. Toward the end of the cooling section, the tow is converted, by suitably positioned guide means, from a flat sheet to a bundle of generally circular cross-section. The tow is then passed over a drum which applies a sufficient tension to the tow to obtain the desired degree of stretch in the filaments thereof as said tow passes through the stretching section.

After passing over this drum, the tow is entered between a pair of positively driven nip rolls into a cutter which cuts the tow into short pieces or "chips" of any desired length. The chips, in which the individual fibers are packed together by the tension applied to the tow and by the action of the nip rolls, fall into the lower portion of an upwardly inclined trough. Simultaneously, a stream of liquid, such as water, is introduced into the lower end of the trough and sweeps the chips upward along and over the upper edge of said trough. The flow of the liquid and chips along said trough initiates the separation of the individual fibers in said chips from each other. The slurry of liquid and fibers is then passed into a distributing tank which is positioned above a moving perforated belt and which is provided with an opening in the floor thereof through which the slurry flows onto said belt. The liquid drains through the perforations in the belt, leaving a blanket of fibers on said belt. The said fibers are then purified, dried and finished in a fashion well known in the art.

The term "filamentary materials" is employed herein to include filaments of indefinite length as well as fibers of staple length.

Figure 11:
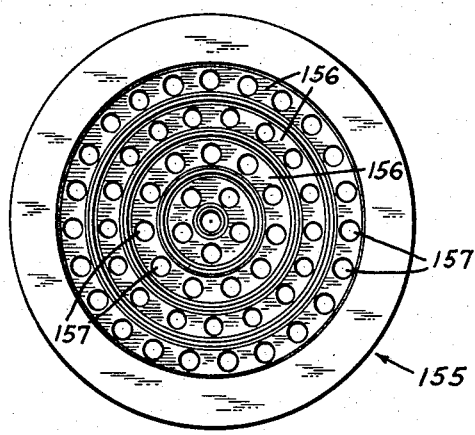
Figure 15:
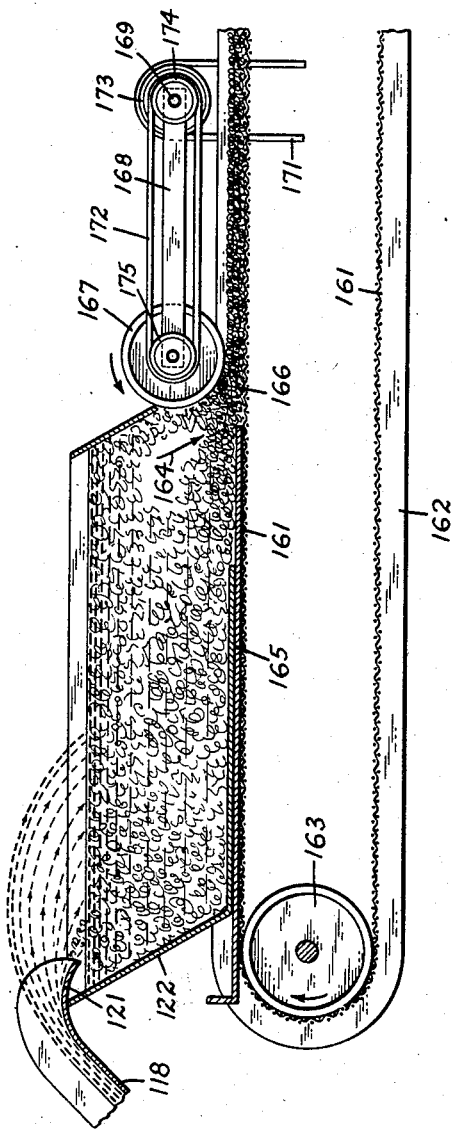

A preferred embodiment of the application of this invention is shown in the accompanying drawings wherein Fig. 1 is a front elevational view, with portions broken away, of the spinning section of the viscose rayon filamentary material producing apparatus, Fig. 2 is a cross-sectional view, on an enlarged scale, taken along the line 2—2 in Fig. 1 in the direction of the arrows, Fig. 3 is a plan view of the stretching section of the viscose rayon filamentary material producing apparatus into which the tow enters after leaving the spinning section of the apparatus, Fig. 4 is a cross-sectional view, on an enlarged scale and with portions broken away, taken along the line 4—4 in Fig. 3 in the direction of the arrows, Fig. 5 is a plan view of the cooling section of the viscose rayon filamentary material producing apparatus into which the tow enters after leaving the stretching section of the apparatus, Fig. 6 is a cross-sectional view, on an enlarged scale and with portions broken away, taken along the line 6—6 in Fig. 5 in the direction of the arrows, Fig. 7 is a plan view, on a reduced scale, of a portion of the cutting and opening section of the viscose rayon filamentary material producing apparatus into which the tow enters after leaving the cooling section of the apparatus, Fig. 8 is a cross-sectional view taken along the line 8—8 in Fig. 7 in the direction of the arrows, Fig. 9 is a cross-sectional view, on an enlarged scale, of the goose-neck connection to the spinning jet, taken along the line 9—9 in Fig. 2 in the direction of the arrows, Fig. 10 is a detail cross-sectional view, on an enlarged scale, of the spinning jet taken along the line 10—10 in Fig. 2 in the direction of the arrows, Fig. 11 is a plan view of the distributing plate employed in the spinning jet, Fig. 12 is a detail perspective view, on an enlarged scale and with parts broken away, of the inlet funnel for guiding the tow into the spinning tube, Fig. 13 is a cross-sectional view taken along line 13—13 in Fig. 2, in the direction of the arrows, Fig. 14 is a perspective view of the plow which is employed in the stretching section to scoop the liquid off the tow, and Fig. 15 is a cross-sectional view, on an enlarged scale, of the distributing tank forming a part of the cutting and opening section of the viscose rayon filamentary material producing apparatus.

*Spinning section*

Referring now to the drawings, and more particularly to Figs. 1 and 2 thereof, the reference numeral 21 designates conduits through which a suitably ripened viscose composition is pumped by any suitable means (not shown) through a goose-neck, indicated generally by reference numeral 23, whose construction will be described more fully hereinafter. The spinning jet 23 is positioned in a trough 24 into which a stream of a suitable coagulating medium is pumped continuously through a conduit 25. The viscose composition emerges from the spinning jet 23 into the coagulating medium in the form of a strand 26 containing up to about 5000, or more, individual filaments which are caused to set by the action thereon of the coagulating medium. The strand 26 together with the coagulating medium then pass through suitable guide means, such as an inlet funnel 27, into a generally U-shaped spinning tube 28, composed of a vertically disposed conduit 29, a horizontally disposed connecting conduit 31 and a vertically disposed conduit 32, all joined together with elbows 33. Grooved guides 34 are provided in each of the elbows 33 to direct the strand 26 through the tube 28 and are positioned so as to guide the strand 26 along the center lines of the conduits 29, 31 and 32 thereby minimizing the development of turbulence in said conduits. The shape and positioning of the grooved guides 34 also tends to cause the flow of the coagulating medium to hold the strand 26 away from the guide thus reducing greatly the tension developed by the friction of the strand 26 against the said guide.

A constant head of coagulating medium is maintained on the inlet funnel 27 by pumping an excess of said medium into the trough 24 and permitting said excess to overflow into a channel 35 connected to a trough 36 which extends parallel to and is positioned adjacent the trough 24. The strand 26 and the coagulating medium emerge from the spinning tube 28 into the trough 36 through suitable guide means, such as an outlet funnel 37, whose cross-sectional area increases toward the discharge end thereof whereby the velocity of the coagulating medium will decrease immediately prior to its discharge from said outlet funnel. As a result, the coagulating medium will show little or no tendency to spurt from said outlet funnel as a column enclosing the tow 26, although a certain amount of the coagulating medium will, of course, be held within the interstices between the filaments of said strand. The coagulating medium which overflows into the channel 35 and which flows through the outlet funnel 37 is drained from the trough 36 through a discharge conduit 38 which is made sufficiently large to prevent the accumulation of large quantities of liquid in said trough. A screen 39 spaced slightly above the floor of the trough 36 traps any broken fibers that may be formed during the spinning operation and keeps them from flowing into the discharge conduit 38. The screen 39 also holds back the strand 26 which emerges from the outlet funnel 37 when starting up the apparatus, permitting the operator to string up the said strand without having to remove any of the strand from the trough 36 during the start up period. The trough 36 is provided with a removable cover 41 and is connected to an exhaust conduit 42 through which any gases or fumes that are liberated during the spinning operation may be drawn off.

As is shown more clearly in Fig. 12, the inlet funnel 27 is provided with radially extending wings 43 and is seated slidably in a collar 44 extending upwardly through the floor of the trough 24. One of the wings 43 is provided with a groove 45 in the face thereof which groove is adapted to receive a pin 46 projecting from the collar 44. When the pin 46 is contained within the groove 45, the inlet funnel 27 is held in elevated position at a point spaced only slightly below the spinning jet 23. In this position, the flow of the coagulating medium into the inlet funnel 27 and through the spinning tube 28 will carry the strand 26 into and through said tube. Once the strand 26 has been threaded through the tube 28, the inlet funnel 27 may be returned to its normal spinning position, as shown in Fig. 2 of the drawings, in which it is spaced further away from the spinning jet 23 than at the start of the spinning operation. This mode of starting the spinning operation eliminates the necessity for wiping the face of the spinning jet 23 during the starting period and thereby reduces the amount of labor involved in said start up.

After emerging from the outlet funnel 37, the strand 26 passes over a two-finger guide 46', which wipes away a portion of the coagulating medium adhering thereto, and then through a slot 47 in the cover 41 to a godet wheel, indicated generally by reference numeral 48. The strands 26 from three spinning jets 23 are joined on the wheel 48 to form a tow 49 which is led from the godet wheel 48 over a guide pin 51 which is positioned at a level higher than said godet wheel. Any desired number of spinning jets 23 and godet wheels 48 may be included in the spinning section of the apparatus, and a tow 49 leaving any one of the godet wheels will ride over the pins 51 without coming into contact with any other of the godet wheels.

The tensions to which the filaments in the strands 26 are subjected in their passage from the spinning jet 23 to the godet wheel 48 may be closely controlled, to produce products having the most desirable physical properties, by regulating the velocity of the viscose composition through the said spinning jets, the spacing between the spinning jet 23 and the inlet funnel 27, the velocity with which the coagulating medium flows through the spinning tube 28 which can be altered by changing the effective liquid head under which said medium flows through said spinning tube and/or the diameter of said spinning tube, and the speed of the godet wheel 48. The two-finger guide 46' may also be adjusted to produce a desirable small additional tension between the said guide and the godet wheel 48. Under normal operating conditions, the filaments travel faster than the coagulating medium immediately after emerging from the spinning jet 23, then the coagulating medium travels faster than the filaments as it flows into and through the first portion of the spinning tube 28, and finally the coagulating medium travels at the same rate as or somewhat slower than the filaments as it flows through the last portion of the spinning tube.

In addition to permitting close control of all the conditions under which the strand 26 is produced, the spinning section of the apparatus of this invention provides a long bath travel in a very small space horizontally which brings the spinnerette 23 and the godet wheel 48 into such close proximity that stringing up by a single operator is extremely simple. The spinning section is also self-threading from the spinnerette 23 through the spinning tube 28 and is free from moving guides or rollers so that its construction and maintenance is simplified. The spinning jets 23 are effectively separated one from the other so that fresh coagulating medium is brought to the filaments emerging from each of said jets without having been contaminated or its concentration changed by contact with viscose from any other jet. Moreover, the filaments from one jet cannot interfere in any way with those of other jets either during start up or when there is a breakdown.

*Stretching section*

Upon leaving the spinning section, the tows 49 enter the stretching section of the apparatus of this invention, the construction of which is shown in Figs. 3 and 4 and in part in Figs. 5 and 6 of the drawings. In the stretching section, the tows 49 are not only plasticized and stretched, but also have removed therefrom the major portion of the carbon disulfide, sulfur and acid sulfate contained therein. One or a plurality of tows 49 enter the stretching section between vertical guide pins 52 which prevent the said tows from becoming entangled with each other. A total of four tows 49 and five guide pins 52 are shown, but any desired number of such tows and guide pins may be employed. After passing between the guide pins 52, the tows 49 merge to form a tow 53 which is in the form of a flat sheet. After passing over a horizontal supporting pin 54 and between a pair of vertical guide pins 55, the tow 53 is passed between a pair of squeeze bars 56 and 57 to express from said tow some of the coagulating medium still adhering thereto. The expressed coagulating medium is collected in chambers 58 and 59 from which it drains through conduits 61 and 62, respectively. The liquid draining through the conduit 61 is returned to the spin bath tank for reuse, whereas the liquid draining through the conduit 62 is sent to a hot dilute acid tank (not shown) from which it is drawn for use as a plasticizing agent. To apply the desired pressure to the tows 53, the upper squeeze bar 57 is fastened to the lower end of a weighted member 63 which is slidably mounted between vertical channels 64. The tow 53 then passes between a pair of vertical guide pins 65 and into an elongated trough 66 which is enclosed by means of a hood 67. The tow 53 enters the elongated trough 66 between a pair of bars 68 and 69, the upper one of which is fastened to the lower end of a door 71 mounted for vertical movement in channels 72, which door closes an opening 73 leading into the hood 67. The weight of the door 71 causes the upper bar 69 to press tightly against the tow 53 as it passes into the hood 67, forming a substantially gas and liquid tight seal with said tow. A liquid capable of plasticizing the filaments in the tow 53 to condition said filaments for a stretching operation, such as a heated solution of dilute sulfuric acid, is introduced into the trough 66 from a conduit 74 through a nozzle 75. The plasticizing liquid enters the trough 66 from a point below the tow 53 and with a high velocity in the direction of travel of said tow. Simultaneously, an additional quantity of plasticizing liquid, which is required adequately to plasticize all the filaments in the tow 53, is introduced through a conduit 76 into a chamber 77 and flows past a baffle plate 78 and through apertures 79 in the floor of the trough 66 into contact with the tow 53. The high velocity with which the plasticizing liquid emerges from the nozzle 75 causes the said liquid thoroughly to impregnate and permeate the tow 53 thereby insuring a uniform plasticization of all the filaments in said tow. In addition, the high velocity of the plasticizing liquid emerging from the nozzle 75 will cause all of the plasticizing liquid to flow along the trough 66 in the same direction as the tow and prevent it from flowing back through the opening 73 when the door 71 is opened during start up. If, however, some of the plasticizing liquid does flow back through the opening 73, it will be collected in the chamber 59 and will be drained therefrom through the conduit 62 to the hot dilute acid tank. During its travel through the trough 66 any gases, including carbon disulfide, which are liberated from the tow 53 will be exhausted from the hood 67 through a conduit 81 (Fig. 6).

After traversing the trough 66, the tow 53 enters a trough 82 which comprises an extension of the trough 66, but is provided with an imperforate floor. The tow 53 then passes under a plow, indicated generally by reference numeral 83 (Figs. 6 and 14), which is pivotally supported from a bar 84 extending between the walls of the trough 82, which plow in operative position is positioned slightly above the tow 53. The plow 83 comprises a plate 85 having a sharp leading edge 86 which acts to lift from the tow 53 a major portion of the plasticizing liquid that is flowing through the trough 82 therewith. Fastened to the upper surface of the plate 85 are a pair of curved deflecting plates 87 which sweep the plasticizing liquid sideways and over the edges of the plate 85, which edges are provided with downturned skirts 88 to keep the plasticizing liquid cascading from the sides of the plate from disturbing the filaments at the edges of the tow 53. A cover 89 fastened to the upper portions of the curved deflecting plates 87 serves to support the plow 83 from the bar 84. The cover 89 may be extended past the edges of the curved deflecting plates 87 to prevent the plasticizing liquid from flowing over the top of the plow 83. The plasticizing liquid which is swept off the tow 53 by the plow 83 drops into a collecting chamber 91 provided with a liquid tight baffle 92 extending across the full width thereof. The major portion of the plasticizing liquid flows over the baffle 92. The remainder of the plasticizing liquid flows from the chamber 91 through a perforated plate 93 into a drain 94 and is then discarded. A plate 95 dipping into the pool of liquid to the left of the baffle 93 forms therewith a gas tight seal to prevent an excessive flow of air into the hood 67 around the plow 83 as the result of the sub-atmospheric pressure maintained within said hood by the exhaust of gases through the conduit 81.

The tow 53, passing under plate 85 of the plow 83, moves between a pair of vertical guide pins 96 and then over a pair of horizontal guide pins 97 supported immediately below the plate 85 by means of brackets 98. The bottom of the trough 66 ends at the vertical guide pins 96, allowing the liquid left on the tow 56 to drain between the guide pins 97 and other horizontal guide pins 101 into the collecting chamber 91. Following its emergence from under the plow 83, the tow 53 passes between a series of vertical guide pins 99 and over the horizontal guide pins 101. The tow 53 then emerges from the trough 82 under a wiper bar 102 fastened to the lower edge of a door 103, similar to door 71, mounted in channels 104, which door is adapted to close opening 105 in the hood 67. The weight of the door 103 causes the wiper bar 102 to press tightly against the tow 53 wiping most of the remaining liquid from the tow and forming a substantially gas and liquid tight seal with said tow.

*Cooling section*

After emerging from the stretching section, the tow 53 enters a cooling section the construction of which is shown in Figs. 5 and 6 of the accompanying drawings. In the cooling section, the tow 53 is sprayed with water from a perforated conduit 106 while passing between pairs of vertical guide pins 107 and over a plurality of horizontal pins 108 supported on a framework 109. The amount of water sprayed onto the tow 53 is sufficient to maintain the concentration of the plasticizing liquid at the desired level which is preferably at about 1% sulfuric acid. The water cools the tows 53 from the temperature to which it is raised by the plasticizing liquid and washes therefrom a portion of the plasticizing medium and impurities adhering thereto and then flows into the collecting chamber 91 from which it is drained through a conduit 110. The liquid flowing over the baffle 92 and the water which drain together through the conduit 110 are returned to the hot dilute acid tank from which it is pumped back to the trough 66 through the conduits 74 and 76. As the tow 53 traverses the cooling section, it passes under wiper bars 111, which wiper bars are fixed to the lower ends of weighted members 111' slideably mounted in vertical channels 111" and which wiper bars express a portion of the wash liquid from the tow to insure a more thorough removal of impurities from the said tow. Approaching the discharge end of the cooling section, the pairs of pins 107 are spaced closer to one another as shown in Fig. 5 of the drawing and convert the tow 53 from a flat sheet to a bundle of generally circular cross-section.

The tow 53 is then passed over a take-up drum, indicated generally by reference numeral 112 (Figs. 7 and 8), which is driven at a speed considerably higher than that of the godet wheels 48 to impart the desired degree of stretch to the filaments in said tow. The major portion of the stretch takes place while the tow 53 is traversing the trough 66 and while it is wet with the plasticizing liquid. However, some of the stretch may also take place both before and after the tow 53 enters the trough 66.

Cutting and opening section

From the take-up drum 112, the tow 53 passes between a pair of vertical guide rollers 113 and then around a guide roller 114 and between positively driven nip rolls 115 positioned closely adjacent to a cutter, indicated generally by reference numeral 116, of a type well known in the art. The close spacing between the nip rolls 115 and the cutter 116, which is preferably less than about 12 inches, prevents the springiness of said tow from causing periodic variations in the feed of the tow 53 to said cutter. The speed of the cutter 116 is adjusted relative to the speed of the nip rolls 115 in such fashion as to cut the tow 53 into chips 117 of any desired length, which chips fall from said cutter 116 into the lower end of an upwardly inclined trough 118. Simultaneously, a stream of liquid is introduced at a high velocity through a nozzle 119 into the lower end of the trough 118 and sweeps the fibers in the chips 117 upward along said trough and over the lip 121 thereof into a distributing tank 122. The flow of the liquid and the chips 117 upwardly along the trough 118 initiates the separation from each other of the individual fibers in the chips 117, which fibers have been packed together by the tension applied to the tow 53 and by the action of the nip rolls 115.

To permit periodic repair and/or replacement of the cutting edges in the cutter 116, there is provided a second cutter 123 which also deposits the chips 117 into the trough 118 and to which the tow 53 may be directed over a guide roller 124 and between positively driven nip rolls 125. As shown in Fig. 7 of the drawings, the nip rolls 125 are also positioned closely adjacent the cutter 123. As a result, no waste is experienced in shifting the tow 53 from one to the other of said cutters.

As shown in Fig. 15 of the drawings, the distributing tank 122 is positioned immediately above an endless wire mesh belt 161 equipped with vertical side walls 162, which belt is positively driven and is trained around roller 163. The distributing tank 122 is provided with an opening 164 in the floor thereof through which the slurry of fibers and liquid can discharge onto the belt 161 and is also provided with an adjustable floor 165 which may be shifted back and forth to control the size of said opening. The slurry of fibers and liquid flowing over the lip 121 of the trough 118 will collect in the distributing tank 122 and will flow along the said tank to the opening 164 in the floor thereof. During this flow, the separation of the chips 117 into fibers will be completed. The liquid then drains through the belt 161, leaving the fibers behind on said belt in the form of a blanket 166. The movement of the belt 161 carries the blanket of fibers 166 under a weighted roller 167 which is carried at the end of an arm 168 pivotally mounted on shaft 169 and which is positively driven from any suitable source (not shown) by means of belts 171 and 172 trained around pulleys 173, 174 and 175. The roller 167 is thus free to move up and down to accommodate itself to changes in the thickness of the blanket of fibers 166 and will act to compact said blanket and express therefrom some of the liquid adhering thereto. The fibers are then purified, dried and finished in conventional manner in a fashion well known in the art.

Goose neck

The goose neck 22 through which the viscose composition is led from the conduit 21 to the spinning jet 23 is of novel construction and provides an obstruction-free path along which said composition may flow without turbulence or leakage. As shown in Fig. 9 of the drawings, the goose neck 22 comprises a base 126 having a pair of parallel uprights 127 and 128 projecting therefrom. A curved conduit 129 is positioned in the upright 127 and leads from a fitting 131, to which the conduit 21 is connected, to an annular fitting 132 provided with a circumferential lip 133 which projects therefrom. The lip 133 extends into a curved conduit 134 which is provided with an annular fitting 135 that bears against the annular fitting 132. To hold the annular fitting 135 firmly in contact with the annular fitting 132, there is provided a threaded member 136 extending through the upright 128, which threaded member 136 bears against the conduit 134 and is held in position by lock nuts 137. As shown in the drawings, the internal diameters of the fitting 131, the conduit 129, the fitting 132, the lip 133 and the conduit 134 are identical so that there are no obstructions to the free flow of the viscose composition therethrough. In addition, the construction shown permits the conduit 134 to be swivelled to raise the spinning jet out of the trough 24 to permit access to the face thereof without the leakage of any of the viscose composition.

Spinning jet

The spinning jet 23 is of novel construction and is shown in detail in Figs. 10 and 11 of the drawings. Referring now to these figures, the reference numeral 138 designates a nut to one side of which is welded the conduit 134 and to the other side of which is welded an externally threaded fitting 139 having a smooth internal bore of a diameter equal to the internal diameter of the conduit 134. In threaded engagement with the fitting 139 is body portion 141 of the spinning jet 23, leakage between said fitting and said body portion being prevented by a compressible washer 142 positioned therebetween. The body portion 141 is provided with an internal cavity 143 whose diameter is equal to that of the fitting 139 adjacent the inlet end thereof and whose diameter increases gradually toward the discharge end thereof. Positioned in the cavity 143 is a flow equalizer 144 which is supported by means of a spider 145 held in position with an expansion ring 146. The cross-section of the flow equalizer 144 comprises a pair of generally conical members joined together with their bases facing one another and with their vertices facing toward the inlet and discharge ends of the cavity 143, respectively. The flow equalizer acts to produce a uniform pressure of viscose composition throughout the entire cross-section of the cavity 143.

An annular cap 147, in threaded engagement with the body portion 141, holds in position, between compressible washers 148 and 149, a filtering and spinning assembly, indicated generally by reference numeral 151. The filtering and spinning assembly 151 comprises a filtering medium 152 including a plurality of layers of fabric 153 and a wire mesh screen 154 stretched across the discharge end of the cavity 143, which layers of fabric and screen acts to remove from the viscose composition any solid particles therein. The filtering medium 152 rests on a supporting plate 155 which is provided with a plurality of concentric grooves 156 in the face thereof and a plurality of apertures 157 extending therethrough from the base of said concentric grooves. The viscose composition flows from the cavity 143 to the apertures in a spinnerette 158, which apertures shape the viscose composition into filaments.

In producing a strand containing a large number of individual filaments, it is important to provide an adequate flow of coagulating medium to each of the filaments as it emerges from the spinnerette 158 to insure that each of the filaments is treated in the same manner and that the gases liberated from the viscose composition are swept away from the vicinity of the spinning jet. If an adequate flow of coagulating medium is not provided, a sufficient quantity of the gases liberated from the viscose composition may accumulate on the lower face of the spinnerette to form bubbles which may interrupt the continuity of spinning of one or more filaments, particularly, where as here, the filaments are spun downwardly from the lower face of the spinnerette. In my application Serial No. 224,348, filed May 3, 1951, and in application Serial No. 224,353, filed May 3, 1951, of Russell O. Denyes, there are disclosed spinnerettes that are specially adapted to be used in the apparatus of the present invention and will insure an adequate flow of coagulating medium to the filaments emerging from each of the apertures in the spinnerette.

Since the solutions employed and produced during spinning, stretching and washing of the viscose fibers are corrosive, the several parts of the apparatus employed for handling the same are made of or coated with corrosion resistant materials such as hard rubber, plastics, ceramics, lead, stainless steel and the like depending upon the use to which each part is put and the mechanical strength required thereof.

It is to be understood that the foregoing detailed description is given merely by way of illustration and that many variations may be made therein without departing from the spirit of my invention.

Having described my invention, what I desire to secure by Letters Patent is:

1. An apparatus for the treatment of filamentary materials, comprising means for forming a tow into a flat sheet of parallel continuous filaments, a trough extended in a substantially horizontal direction, means for moving said flat sheet along said trough, a conduit for passing treating liquid to said trough, said conduit terminating in a nozzle having a more constricted passage than other parts of said conduit to introduce a liquid treating medium into said trough at a high velocity, said nozzle being positioned to direct said treating liquid through said trough in the same direction as the flat sheet to cause the liquid thoroughly to impregnate and permeate the flat sheet thereby insuring a uniform treatment of all the filamentary materials in the tow, the construction and arrangement being such that the stream of liquid introduced by said nozzle meets said flat sheet in said trough.

2. Apparatus as set forth in claim 1 and further comprising means for stretching said sheet lengthwise during its passage through said trough.

3. An apparatus for the treatment of filamentary materials, comprising a trough, means for moving a tow of filamentary materials in the form of a flat sheet and a liquid treating medium along said trough, and a plate positioned substantially parallel to said tow and immediately above said tow for lifting off said tow a portion of the liquid treating medium flowing through said trough therewith.

4. An apparatus for the treatment of filamentary materials, comprising a trough, means for moving a tow of filamentary materials in the form of a flat sheet and a liquid treating medium along said trough in the same direction, a plate positioned immediately above said tow for lifting off said tow a portion of the liquid treating medium flowing through said trough therewith, and curved deflecting members connected to the upper surface of said plate for sweeping the liquid treating medium over the side edges of said plate.

5. An apparatus for the treatment of filamentary materials, comprising a trough, means for moving a tow of filamentary materials in the form of a flat sheet and a liquid treating medium along said trough in the same direction, a pivotally supported plate having a sharp leading edge positioned immediately above said tow for lifting off said tow a portion of the liquid treating medium flowing through said trough therewith, curved deflecting members connected to the upper surface of said plate for sweeping the liquid treating medium over the side edges of said plate, and skirts projecting downwardly from the side edges of said plate to keep the liquid treating medium from flowing to the undersurface of said plate and again contacting the tow.

6. An apparatus for the treatment of filamentary materials, comprising a trough, means for moving a tow of filamentary materials along said trough in the form of a flat sheet, a nozzle for introducing a liquid treating medium into said trough at a high velocity, said nozzle being positioned to direct said treating liquid through said trough in the same direction as the tow to cause the liquid thoroughly to impregnate and permeate the tow thereby insuring a uniform treatment of all the filamentary materials in the tow, and a plate positioned substantially parallel to, and immediately above, said tow for lifting off said tow a portion of the liquid treating medium flowing through said trough therewith, and deflecting means for sweeping the lifted liquid over the side edges of said plate.

7. An apparatus for the treatment of filamentary materials, comprising a trough having a plurality of perforations in the floor thereof, means for moving a tow of filamentary materials along said trough in the form of a flat sheet, means for introducing a liquid treating medium into said trough through said perforations, and a nozzle for introducing a further quantity of a liquid treating medium into said trough at a high velocity, said nozzle being positioned to direct said treating liquid through said trough in the same direction as the tow to cause the liquid thoroughly to impregnate and permeate the tow thereby insuring a uniform treatment of all the filamentary materials in the tow, a pivotally supported plate having a sharp leading edge positioned immediately above said tow for lifting from said tow a portion of the liquid treating medium flowing through said trough therewith, curved deflecting members connected to the upper surface of said plate for sweeping the liquid treating medium over the side edges of said plate, and skirts projecting downwardly from the side edges of said plate to keep the liquid treating medium from flowing to the undersurface of said plate and again contacting the tow.

8. Process for the treatment of filamentary materials which comprises moving a tow of filamentary material in the form of a flat sheet of parallel continuous contiguous filaments through a substantially horizontal trough containing a liquid medium for treating said filaments and introducing said treating liquid through a conduit to said trough, constricting said liquid in a nozzle to increase its velocity and passing said liquid through said nozzle into said trough in a substantially horizontal direction at a high velocity in the same direction as the tow to cause the liquid thoroughly to impregnate and permeate the tow thereby insuring a uniform treatment of all the filamentary materials in the tow, 9. Process as set forth in claim 8 and further comprising stretching said tow in said trough.

10. An apparatus for the treatment of filamentary materials, comprising means for forming a tow into a flat sheet of parallel continuous filaments, a trough, means for moving said flat sheet along said trough, a nozzle for introducing a liquid treating medium into said trough at a high velocity, said nozzle being positioned to direct said treating liquid through said trough in the same direction as the flat sheet to cause the liquid thoroughly to impregnate and permeate the tow thereby insuring a uniform treatment of all the filamentary materials in the tow, said trough having a plurality of perforations in the floor thereof, and means for introducing a further quantity of a treating liquid into said trough through said perforations.

11. An apparatus for the treatment of filamentary materials, comprising means for forming a tow into a flat sheet of parallel continuous filaments, a trough extended in a substantially horizontal direction, means for moving said flat sheet along said trough in a rectilinear path, a conduit for passing treating liquid to said trough, said conduit terminating in a nozzle having a more constricted passage than other parts of said conduit to introduce a liquid treating medium into said trough at a high velocity, said nozzle discharging directly into said trough and being positioned to direct said treating liquid through said trough in the same direction as the flat sheet to cause the liquid thoroughly to impregnate and permeate the tow thereby insuring a uniform treatment of all the filamentary materials in the tow.

References Cited in the file of this patent

UNITED STATES PATENTS

| | | |
|---|---|---|
| 263,728 | Sargent | Sept. 5, 1882 |
| 663,452 | Maertens | Dec. 11, 1900 |
| 1,913,601 | Leppin | June 13, 1933 |
| 2,041,338 | Harrison | May 19, 1936 |
| 2,210,826 | Williams | Aug. 6, 1940 |
| 2,313,006 | Ufnowski | Mar. 2, 1943 |
| 2,447,994 | Wicker | Aug. 24, 1948 |
| 2,502,972 | McCallum | Apr. 4, 1950 |
| 2,517,711 | Pool et al. | Aug. 8, 1950 |
| 2,532,458 | New | Dec. 5, 1950 |
| 2,558,734 | Cresswell | July 3, 1951 |
| 2,559,700 | Bauer | July 10, 1951 |
| 2,613,522 | Heffelfinger | Oct. 14, 1952 |
| 2,624,189 | Pendleton | Jan. 6, 1953 |
| 2,634,596 | Pendleton | Apr. 14, 1953 |
| 2,674,113 | Schrenk | Apr. 6, 1954 |
| 2,726,134 | Hicks | Dec. 6, 1955 |